June 10, 1958  A. W. JOHNSON  2,837,975
MACHINE TOOL
Filed Jan. 8, 1954  6 Sheets-Sheet 1
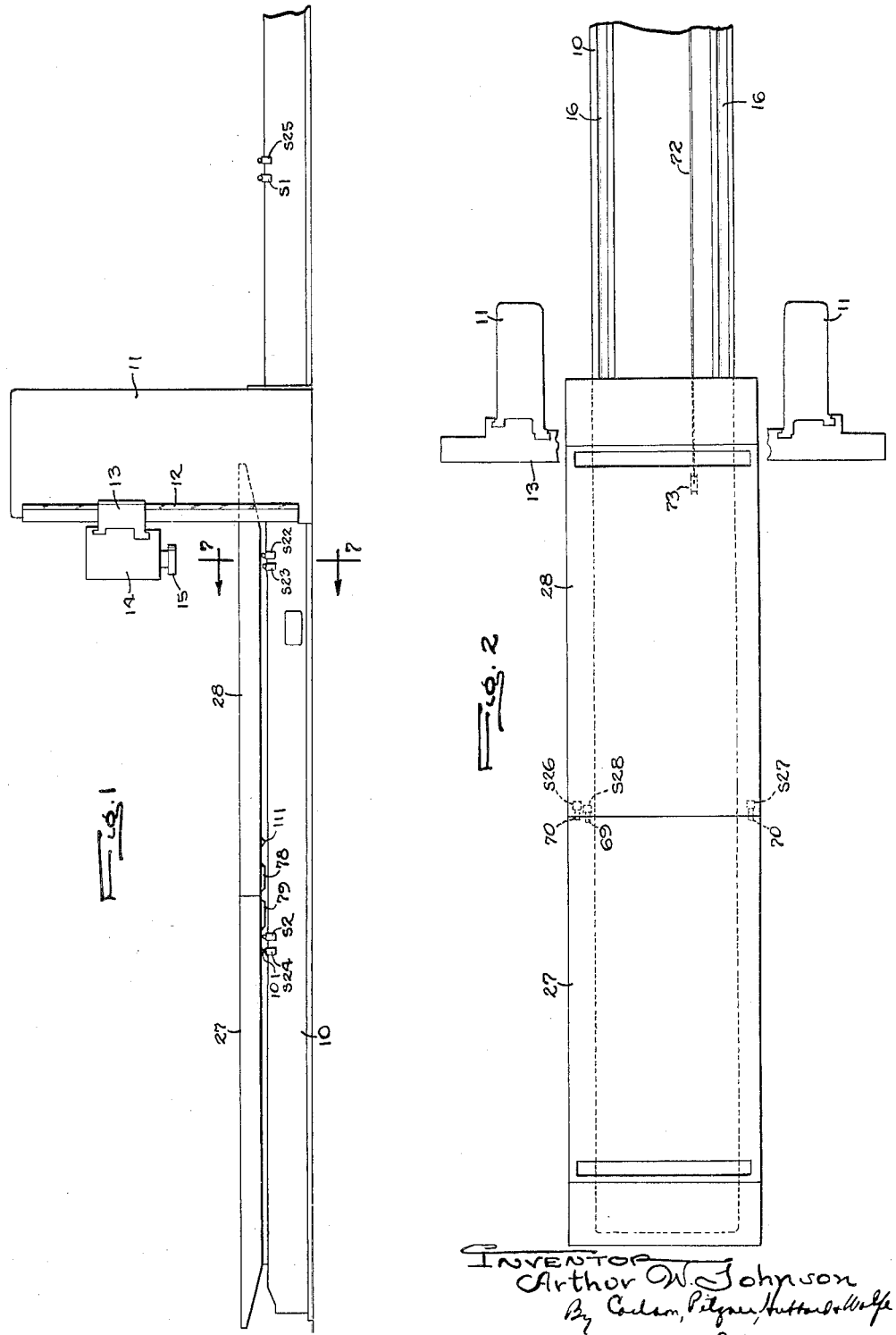

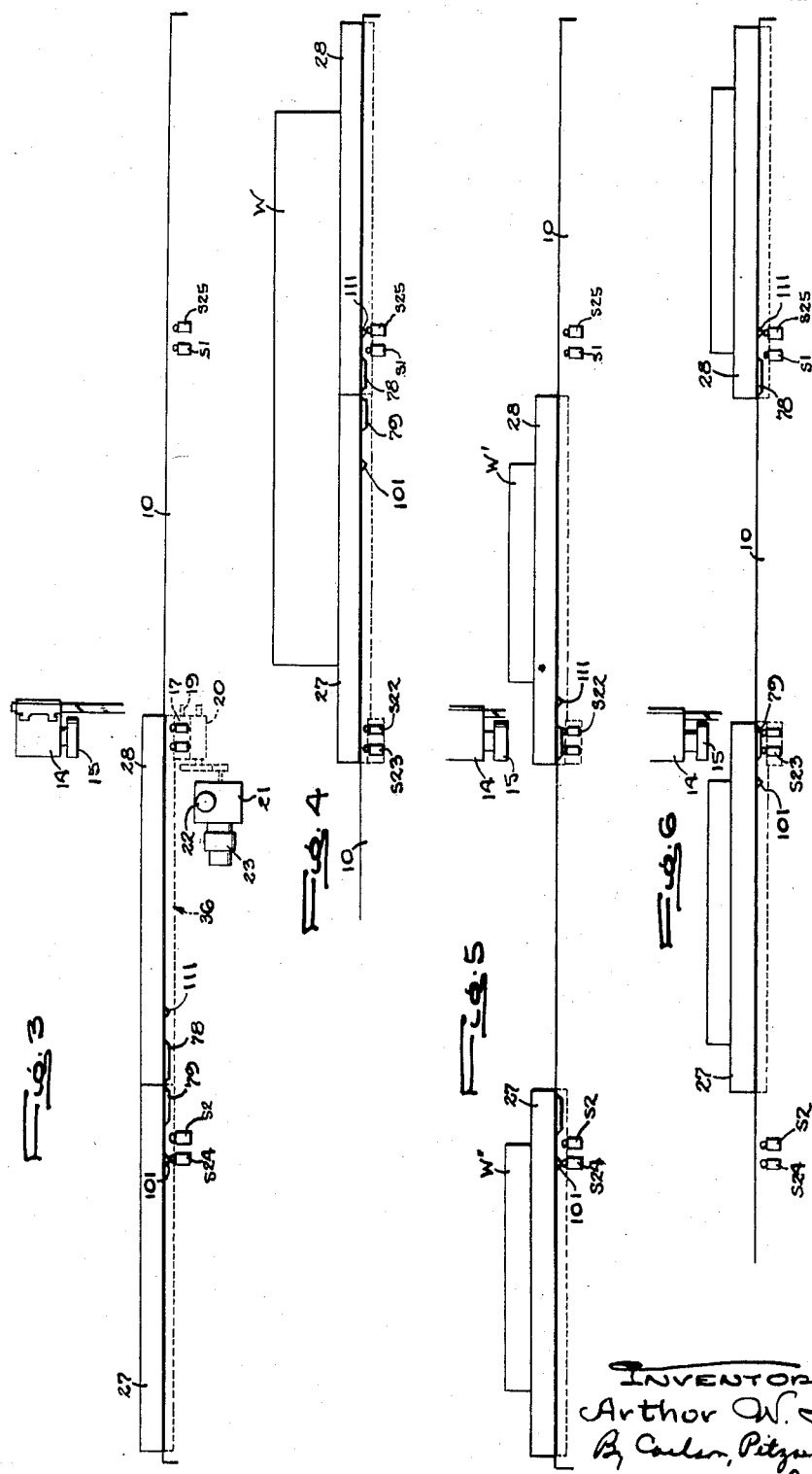

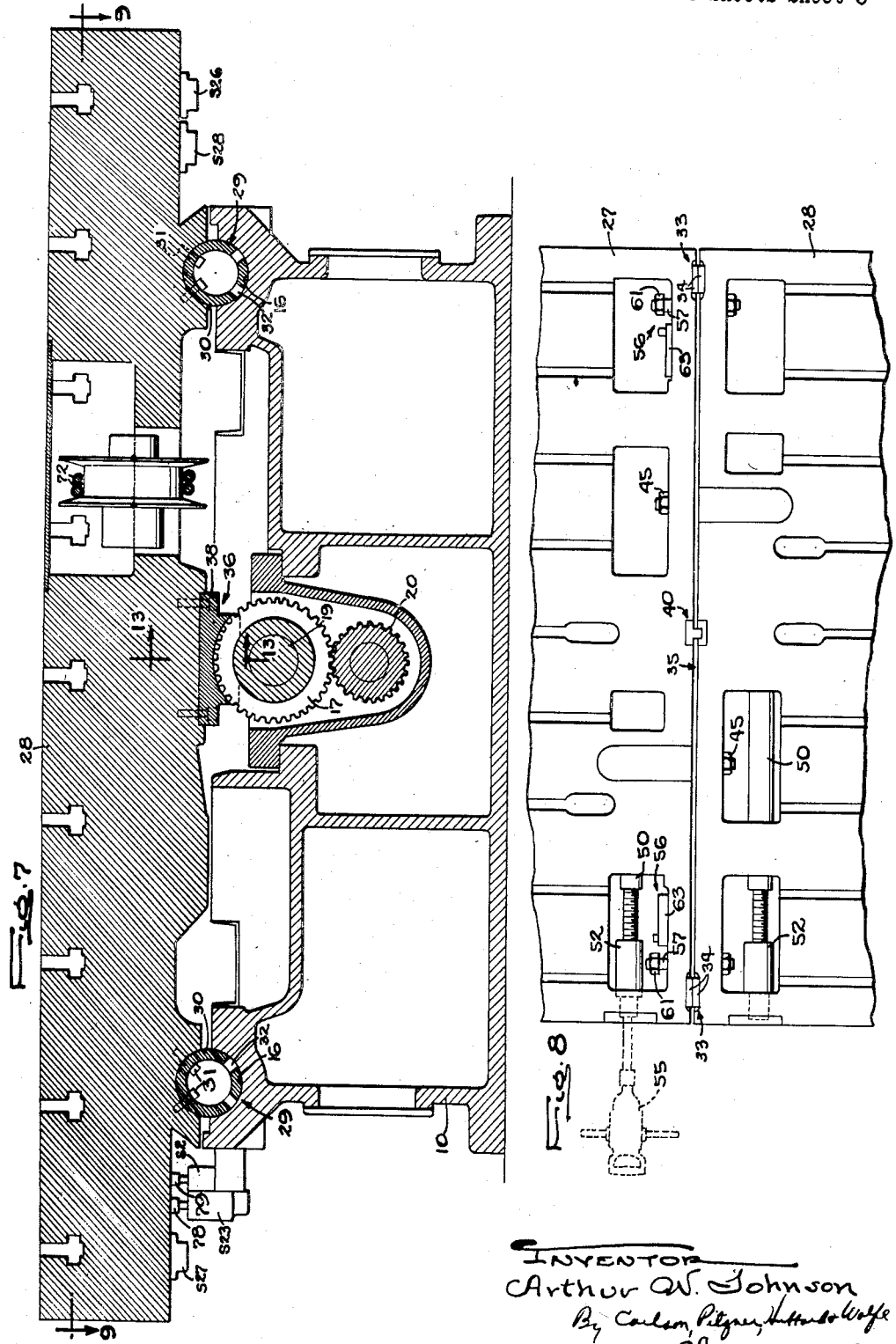

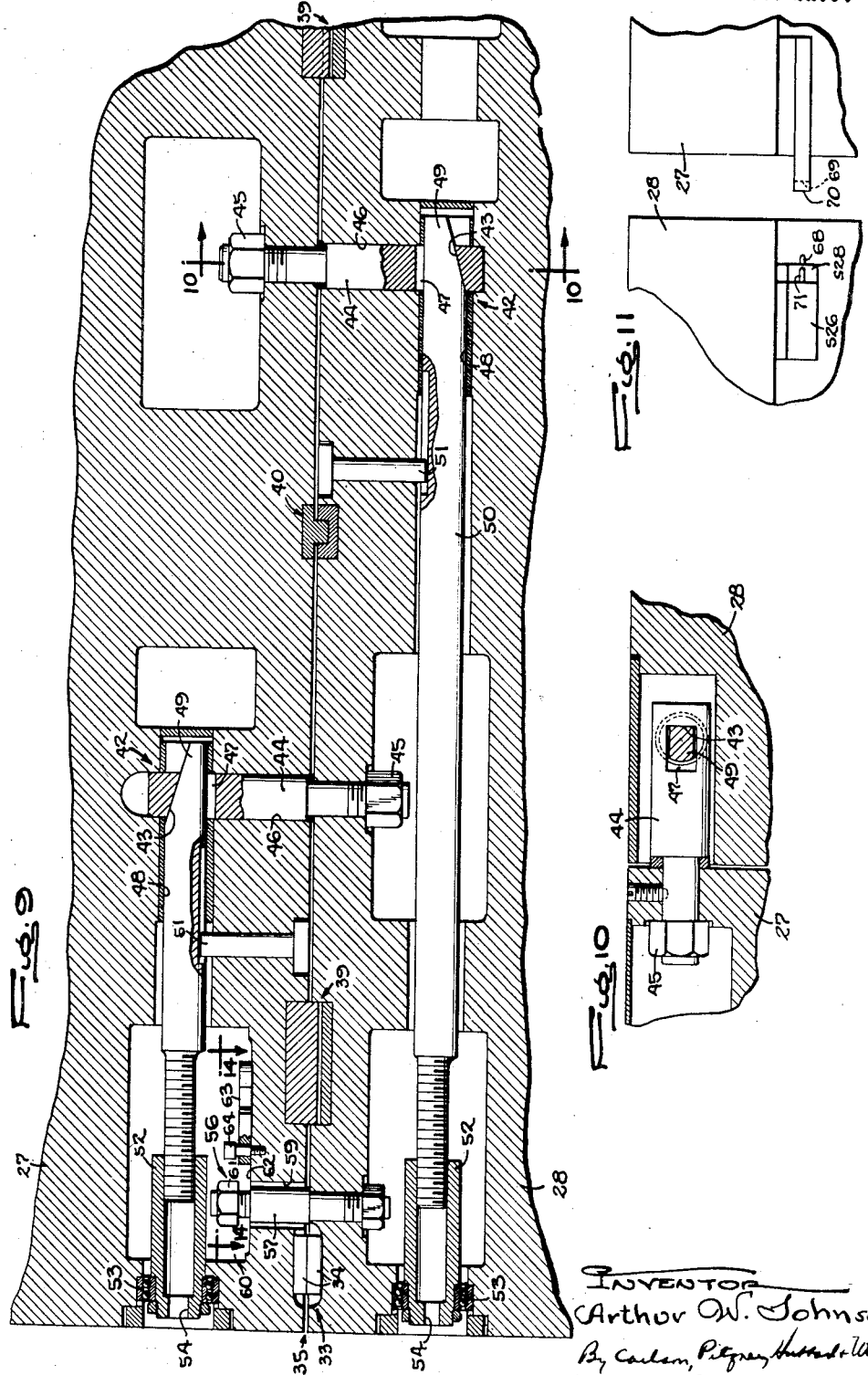

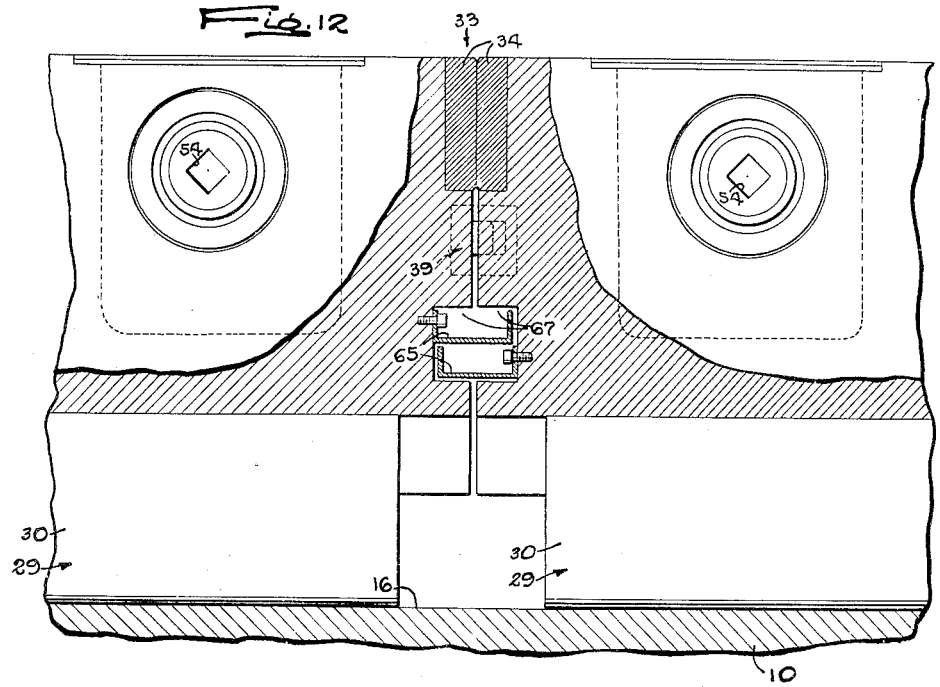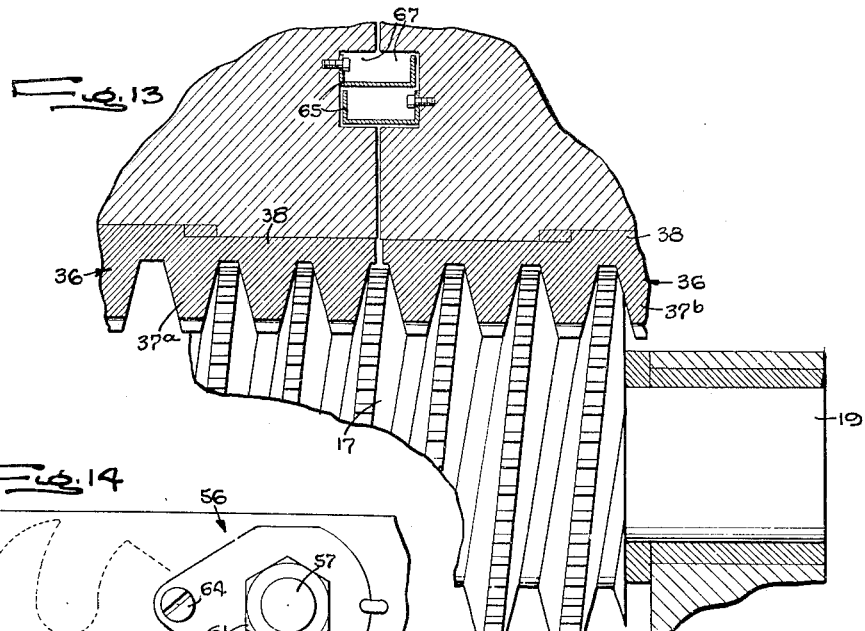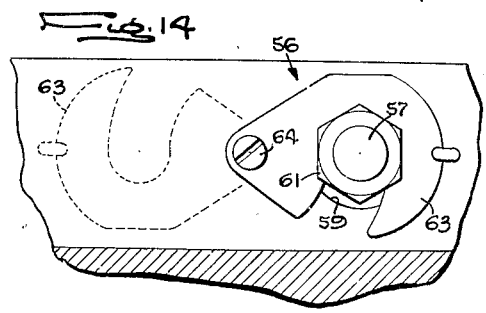

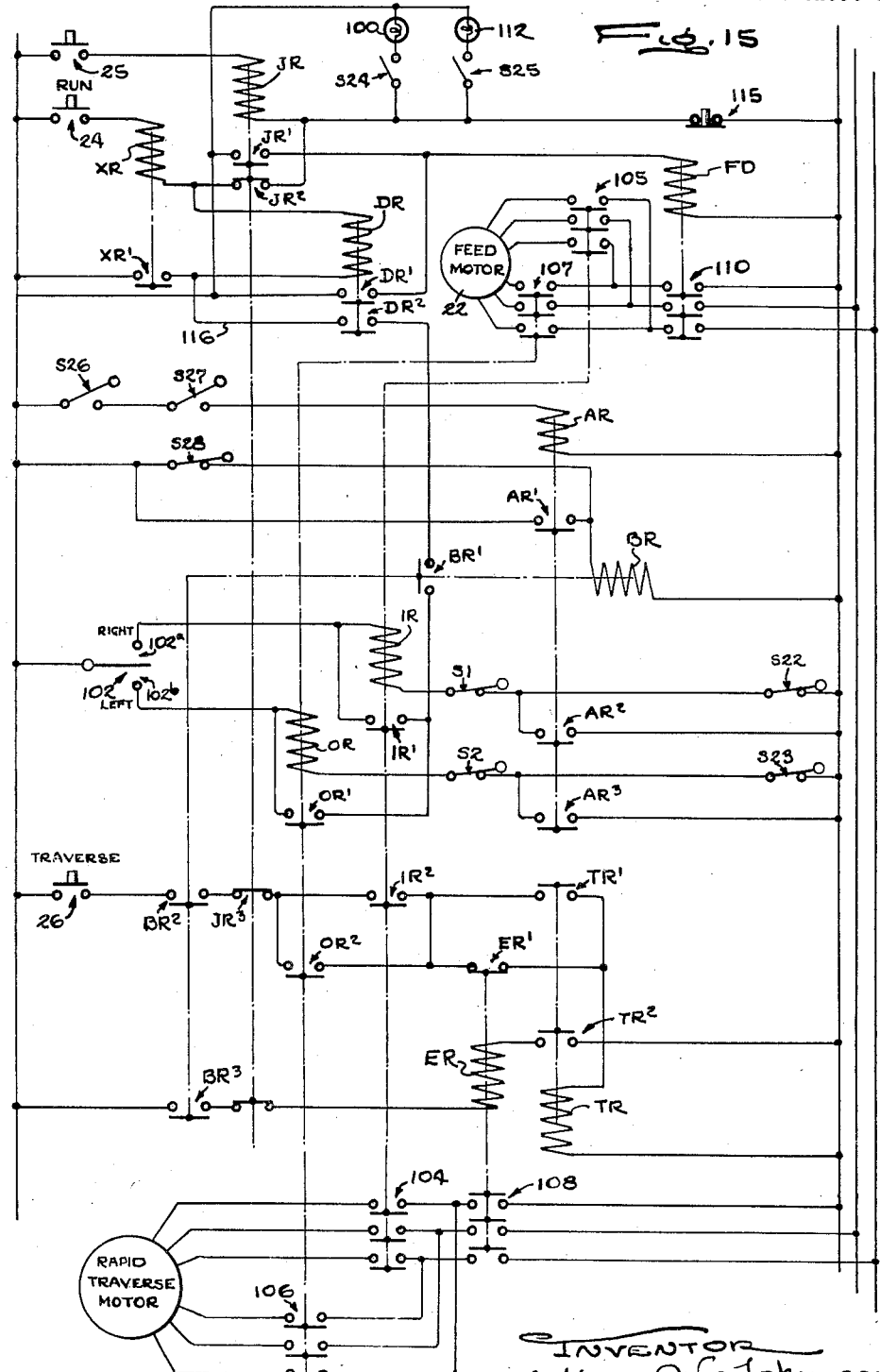
June 10, 1958     A. W. JOHNSON     2,837,975
MACHINE TOOL
Filed Jan. 8, 1954     6 Sheets-Sheet 6

United States Patent Office 2,837,975
Patented June 10, 1958

2,837,975
MACHINE TOOL

Arthur W. Johnson, Rockford, Ill., assignor to The Ingersoll Milling Machine Company, Rockford, Ill., a corporation of Illinois Application January 8, 1954, Serial No. 402,917

1 Claim. (Cl. 90—21)

This invention relates to machine tools of the type in which the work while being machined is clamped to a table slidable along an elongated horizontal bed which projects in opposite directions from a column or other tool support. More particularly, the invention relates to such a machine tool in which the table is composed of two parts, usable together in the handling of long work pieces and separately to permit a short work piece to be machined on one table part while a second work piece is being set up on the other table part while the latter is parked in an out-of-the-way position on the machine bed. In machine tools of this character, the combined table or the individual tables are moved back and forth by a single power driven feed element adapted for meshing engagement with teeth extending along both of the table parts.

The object of the present invention is to provide a novel arrangement of limit devices rendered operative selectively to determine the extent of permissible movement of the combined table or of the individual tables while being used separately.

Other objects and advantages of the invention will become apparent from the following detailed description taken in connection with the accompanying drawings, in which Figure 1 is a fragmentary side elevational view of a machine tool embodying the novel features of the present invention.

Fig. 2 is a fragmentary plan view.

Figs. 3, 4, 5, and 6 are diagrammatic views illustrating the different ranges of movements of the different tables.

Fig. 7 is a cross section taken along the line 7—7 of Fig. 1.

Fig. 8 is a fragmentary plan view of the adjacent ends of the connected tables.

Fig. 9 is a fragmentary sectional view taken along the line 9—9 of Fig. 7.

Fig. 10 is a fragmentary sectional view taken along the line 10—10 of Fig. 9.

Fig. 11 is a fragmentary side elevational view of the table ends.

Fig. 12 is a fragmentary side elevational view looking from the left of Fig. 9 with certain of the parts broken away.

Fig. 13 is a fragmentary sectional view taken along the line 13—13 of Fig. 7.

Fig. 14 is a fragmentary sectional view taken along the line 14—14 of Fig. 9.

Fig. 15 is an electric circuit diagram.

In the drawings, the invention is shown for purposes of illustration incorporated in a planer type milling machine having the usual elongated horizontal bed 10 bridged by an inverted U-shaped column 11 straddling and fixed to the bed and slidably supporting on vertical ways 12 a vertically adjustable cross rail 13 carrying one or more horizontally adjustable heads 14 each with a power rotated cutter 15 thereon. The bed of such tools has laterally spaced guideways 16 slidably supporting a work table which is reciprocated back and forth by a power driven mechanism having a rotary feed element 17 mounted on the bed and adapted to mesh with a complemental feed element 36 on the underside of the table.

While the feed mechanism may take various forms well known in the art, the one shown herein forms the subject matter of Patent 2,072,340 to which reference may be made for further details. As shown in Figs. 3, 7, and 13, the rotary feed element 17 is a worm fast on a shaft 19 journaled on the bed at the longitudinal center of the latter for rotation about a horizontal axis disposed midway between and paralleling the two guideways 16. Spur teeth cut in the outer edge of the worm thread mesh with a gear 20 which, through suitable reduction gearing in a box 21 may be driven at feed and rapid traverse rates by selective operation of a feed motor 22 and a rapid traverse motor 23.

Starting and stopping of the motors and operation thereof in one direction or the other may be controlled by run, jog, and rapid traverse push button switches 24, 25, and 26 (Fig. 15) and a direction selector switch 102 operating through relays and circuitry of well know character such for example as that disclosed in Patent 2,224,107. Those elements of the patented circuit related to the present invention are shown in the simplified circuit of Fig. 15.

Two tables 27 and 28 are mounted on the bed in end to end relation and arranged to be joined together at their adjacent ends to form a single table unit as shown in Figs. 1, 2, and 3 for handling a long workpiece W or, for alternative use, to be detached from each other so as to enable the single feed mechanism to be used selectively in parking either of the tables at its end of the bed (see Figs. 5 and 6) and thereafter feeding the other table back and forth past the cutter 15. In this way, a workpiece W' on one work table, for example the table 28 (Fig. 5) may be machined by the cutter while a second workpiece W" is being set up on the parked table 27 so as to be ready for machining as soon as the first workpiece has been completed. It is possible therefore to greatly reduce the idle time of the cutter when the workpieces being machined are short enough to be handled on the individual tables 27 and 28.

To provide feed ranges of equal and optimum length for the tables 27 and 28, each of the latter is preferably made of a length approximately ¼ of the length of the bed ways 16, and the drive worm 17 is located at the longitudinal center of the bed and directly beneath the crossrail and the cutter 15. Each table comprises an elongated rigid casting having along its underside laterally spaced ways 29 (Fig. 7) which are semicircular in this instance and seated in the mating bed ways 16 along which each table is slidable through a range of approximately ¾ of the length of the bed ways, the remaining length of the bed being occupied by the other or parked table. The table ways 29 are formed by the outer surfaces of tubes 30 clamped to the underside of the table as by screws 31 and forming reservoirs for liquid lubricant adapted to be distributed to the bed ways through holes 32.

Alternative use of the tables in the above manner and driving thereof by the single feed mechanism is made possible by the provision of means for joining the tables together in a precise relationship and by employing on the respective tables identical feed elements 36 arranged to mesh accurately with the driving worm 17 when the tables are joined. Accordingly, the table elements 36 comprise rows 37ª and 37ᵇ of teeth identically contoured to mate with the thread of the worm and projecting from a bar 38 fastened to the under side of the table along the longitudinal center line thereof. The two racks thus formed are alined and spaced longitudinally so that the teeth parallel each other and the adjacent teeth of the separate racks are, as shown in Fig. 13, spaced apart precisely the same as the teeth of the individual racks. Thus, when the tables are joined together accurately in the manner later described, the two racks are combined to form a feed element extending the full length of the combined table and of precisely uniform pitch so as to mesh properly with the worm thread when the latter is engaging both of the adjacent teeth of the two racks (see Fig. 13) while the drive is being transferred from one table to the other during movement of the two tables as a single unit either during the machining of a single workpiece or in the parking of one of the tables.

To minimize the possibility of chips or other foreign matter coming between the adjacent ends of the tables while being joined and thus prevent proper meshing of feed elements during transfer of the drive from one table to the other, the abutting engagement is confined to two laterally spaced and vertically disposed pairs of contact areas 33 (Figs. 8 and 9) formed on the ends of short projections or buttons 34 on the opposed ends of the two tables preferably near the outer margins thereof. When the buttons on the table ends come into full abutment with each other as shown in Fig. 9, the remaining end surfaces of the tables are separated by a narrow gap 35 (Fig. 8) preferably about an eighth of an inch wide.

Any lateral shifting of the separated tables out of precise alinement either horizontally or vertically is corrected automatically as the tables come into final abutting engagement at the contact areas 33. This is accomplished by key devices 39 and 40 (Figs. 8, 9, and 12) having male and female parts secured to the opposed ends of the two tables and adapted to fit together in a precise relationship when in full engagement (Fig. 12). Beveling of the key walls at the outer ends of the projections and grooves insures proper entry of the projections as the tables approach each other.

To enable the parked table to be picked up and, by the feed mechanism, pulled into machining position, provision is made for quickly clamping the tables together in precise alinement and then releasing the two when the other table has been pushed to and parked at its end of the machine bed. This is accomplished by two clamps 42 (Fig. 9) including inclined jaws 43 on the outer ends of horizontal rods 44 laterally spaced apart and projecting in opposite directions from the adjacent ends of the two tables. The shouldered end of each rod extends into the table end and is anchored by a nut 45.

The rod 44 on each table is positioned to enter a hole 46 in the other table as the two approach each other, the holes being sized to provide sufficient clearance to accommodate any possible misalinement of the tables that may develop while the two are separated. Each of the jaws 43 forms one wall of a hole 47 which extends horizontally and crosswise through the rod and which, when the tables are in full abutment at the contact areas 33, registers with a guideway 48 which opens outwardly at one side of the tables and supports a wedge 49 on the inner end of a rod 50. The jaw 43 is inclined to complement the wedge surface so that by projecting the wedge inwardly, the rod 44 will be drawn further into the hole 46 thus clamping the tables rigidly together.

The wedges 49 are held against turning by keys 51 and each is shiftable back and forth by turning of a nut 52 screwed onto the outer end of the wedge and journaled in bearings 53 near the edge of the table. To facilitate rapid closing or release of the wedge clamp, the outer end of the nut is located for convenient access near one side edge of the table and formed with a socket 54 into which the tool of a power driven wrench 55 (Fig. 8) may be inserted. Quick action of both clamps is achieved by locating the nut sockets 54 of both wedges at the same side of the two tables so that the wrench 55 may be applied first to one nut and then the other by an operator standing along one side of the machine bed.

When the tables are to remain connected for a substantial length of time and used as a single unit, a second set of clamps 56 is preferably employed for locking the tables together. Like the quick acting clamps 42, the clamps 56 comprise laterally spaced rods 57 (Figs. 8, 9, and 14) anchored in the respective tables and projecting horizontally from the adjacent ends of the latter so that, when the tables approach each other, the ends will enter and be projected through holes 59 which extend into the table ends and communicate with recesses 60 which are accessible from the table tops. The holes 59 are large enough to permit the passage therethrough of nuts 61 threaded onto the ends of the rods and, when the tables are in abutment, are spaced inwardly from walls 62 of the recesses 60 far enough to receive a member 63 of larger size than the holes 59.

Herein, each member 63 is a C-shaped hook (Fig. 14) loosely pivoted at 64 on the wall 62 and adapted to swing in a vertical plane through a half revolution from an inactive position shown in phantom in Fig. 14 to an active position in which the member hooks over or straddles the rod 57. After the C-hook has been swung into active position, the nut 61 is tightened by a wrench inserted down through the table top, the clamping force thus derived being transmitted to the table through the hook. When both clamps 56 are thus activated and the parts thereof tightened, an extremely rigid connection is formed between the tables which are keyed together in precise alinement and abutment at the contact areas 33. To release the clamps 56 and permit separation of the tables, it is only necessary to loosen the nuts 61 and swing the hooks out of the way as shown in phantom in Fig. 14.

Any chips that may accumulate on top of the tables at the joint between the two are prevented from falling down onto the bed ways 16 when the tables are separated. For this purpose, narrow troughs 65 (Figs. 12 and 13) are bolted to the opposed table ends, above the bedways, each trough projecting beyond the table end and into a recess 67 in the opposed table when the tables are joined together as shown in Fig. 12. With two troughs disposed one above the other, the bed ways will remain covered until the table ends have separated a distance equal to twice the width of the individual troughs by which time any chips at or near the table ends will have fallen into the troughs.

Means is provided for sensing the approach of the tables to each other and automatically controlling the feed mechanism so as to prevent rapid traversing of the tables into full abutment. This means includes a switch S28 (Figs. 2, 7, 11, and 15) secured to the underside of the table 28 adjacent the inner end thereof with its actuating pin 68 positioned for engagement by a dog 69 on the table 27 so as to be opened when the table ends approach close to each other, for example, within 1/8 of an inch, the switch being adapted for the required overtravel as the tables continue into full abutment. The switch is interposed in the circuit for a relay BR as shown in Fig. 15.

For purposes to appear later, provision is also made for indicating when the two tables come into full abutment at the contact areas 33 and are clamped firmly together. This is accomplished by sensitive switches S26 and S27 (Figs. 1, 2, 7, 11, and 15) mounted on the underside of the table 28 at opposite side margins and at the inner end thereof for engagement of their actuating pins 71 by dogs 70 on the table 27 when the contact areas of the two tables come within a few thousandths of an inch of each other as will be the case when the tables have been moved together and one of the sets of clamps 42 or 56 has been activated. Closure of both switches is a signal that the tables have been connected properly. Conductors leading to the various switches on the table 28 are housed within a cable 72 (Figs. 3 and 7) which is wound around an automtic take up reel 73 journaled on the table 28, the conductors having suitable commutator connections with the respective switches.

The invention contemplates a novel arrangement of limit switches for differentially controlling the feed mechanism 17, 36 to enable the combined table to be moved over the full length of the bed 10 while limiting the individual movement of each table outwardly along its own end of the bed so as to avoid disengagement of the feed worm 17 and the teeth on such table during feeding of the table past the cutter. For these purposes, a normally closed switch S1 (Figs. 1, 3, and 15) is secured to right end portions of the bed 10 and arranged to be opened by a dog 73 on the table 28 when the latter moves outward slightly beyond the parked position shown in Fig. 6. A similar switch S2 is secured to the other end portion of the bed and arranged to be opened by a dog 79 on the table 27 when the latter is moved outward slightly beyond the parked position shown in Fig. 5. As shown in Fig. 15, the switch S1 coacts with the direction switch 102ª to control the circuit of a relay 1R which when energized closes switches 104 and 105 conditioning the rapid traverse and feed motors for movement of the table to the right. In a similar way, the switch S2 coacts with the direction switch 102ᵇ to control a relay OR which actuates switches 106 and 107 that condition the motors 23 and 22 for reverse operation and movement of the table to the left.

Outward movement of the table 27 toward its own or left end of the bed when it is disconnected from the table 28 is limited by opening of a normally closed switch S23 (Figs. 6 and 15) secured to the bed 10 and arranged to be opened by the dog 79 when the table 27 alone is moved to the left to the position shown in Fig. 6. The switch is included in the circuit for the relay OR along with the switches 102ᵇ and S2. Similarly, a normally closed switch S22 (Figs. 5 and 15) is included with the switches 102ª and S1 in the circuit of the relay IR and is arranged to be opened by the dog 78 when the table 28, after disconnection from the table 27, is moved past the cutter 15 to the position shown in Fig. 5.

When the two tables are connected together and being moved along the bed either to park one of the tables or to machine a long workpiece, the switches S22 and S23 are disabled and prevented from performing the limiting action above described. To this end, the switches S26 and S27 are in series in a circuit (Fig. 15) for energizing a relay AR having normally open switches AR2 and AR3 shunted across the switches S22 and S23 respectively. Thus, when the two tables are joined together, a condition indicated by closure of both of the switches S26 and S27 as above described, the switches AR2 and AR3 will be closed and opening of either of the switches S22 and S23 will have no effect in stopping the feed or rapid traverse motors. The coupled tables may thus be moved back and forth within a range determined by the outer limit switches S1 and S2 and covering the full length of the bed.

*Operation*

The manner of controlling the operation of the feed mechanism to use one or both of the tables 27, 28 will now be described by reference to Figs. 3 to 6 and 15, the switches of each of the relays being designated by the addition of numbers to the reference letter indicating that relay. Assume first that a workpiece W' on the table 28 has been finished and the next workpiece W'' to be machined has been set up on the table 27 as shown in Fig. 5 whose parked condition is indicated by a signal lamp 100 (Fig. 15) lighted by closure of a switch S24 by a dog 101 (Fig. 5) on the table 27. At this time, the switch S28 will be closed and its relay BR energized closing the switches BR2 and BR3.

To park the table 28 at its right hand end of the bed, it is first moved into abutment with and coupled to the table 27. To accomplish this, the selector switch 102ᵇ is closed energizing the relay OR to close the conditioning switches 106 for the rapid traverse motor 23. At the same time, the push button switch 26 is closed to energize a relay TR through the closed switches BR2, JR3, OR2, and ER1. Energization of the relay TR closes a self sealing switch TR1 and also a switch TR2 to energize a relay ER which opens the switch ER1 and closes switches 108 to start the rapid traverse motor 23.

The table 28 continues to the left at the rapid traverse rate until it approaches within a fraction of an inch of the table 27 whereupon the switch S28 is opened to deenergize the relay BR and open the switches BR2 and BR3 so as to deenergize the relays TR and ER thus stopping the rapid traverse motor and also disabling the control switch 26.

The tables are brought together slowly by operating the jog switch 25 whose closure energizes a relay JR closing its switch JR1 to complete the circuit for energizing a relay FD to close switches 110 and start the feed motor 22 in the left hand direction determined by the selector switch 102. By proper manipulation of the switch 25, the table 28 may be jogged into abutment with the parked table 27.

When the tables come into full contact at the areas 33, the switches S26 and S27 are both closed so as to energize the relay AR which closes a switch AR1 to bypass the switch S28 and energize the relay BR to render the rapid traverse switch 26 again operative. At the same time, switches AR2 and AR3 are closed thus bypassing the limit switches S22 and S23 which limit the range of movement of the individual tables 27 and 28 past the cutter 15 when these tables are used separately.

By application of the power wrench 55 to the two nuts 52, the wedges 49 are shifted into the holes 47 to clamp the two tables together. The combined table unit thus formed (see Fig. 1) may be moved at rapid traverse in either direction but since the table 27 is near the left limit of its range, further movement in that direction will immediately cause the dog 79 to open the switch S2 thereby deenergizing the relay OR so as to open switches OR1, OR2, 106 and 107 which disable both the feed and rapid traverse motors.

As a preliminary to moving the combined table to the right, the direction selector is shifted to close the switch 102ª thereby energizing the relay IR which closes switches IR1, IR2, 104, and 105 to condition the feed and rapid traverse motors for operation in the right hand direction. Rapid traverse may then be initiated by closure of the switch 26 which results in energization of the relays TR and ER as described above and closure of the switches 108 to complete the motor circuit and initiate rapid movement of the tables to the right. Since the tables are coupled together, the switches S26 and S27 are closed and the relay AR thereby energized so that by closure of its switch AR2 the limit switch S22 is by-passed to permit the relay IR to remain energized as the table 28 moves beyond the drive worm 17 and the drive is transferred to the teeth on the table 27.

When the combined table unit reaches the right hand end of the bed as shown in Fig. 2, a switch S25 will be closed by a dog 111 on the table 28 thereby lighting a signal lamp 112 to indicate to the operator that the table has reached its parked position. Any substantial movement beyond this position will result in opening of the switch S1 and a consequent deenergization of the relay IR to open the switches 104 and 105 of the two motors. Normally, the stopping of the table will be effected by opening of switches 108 as the rapid traverse button is released.

To leave the table 28 in parked position and bring the workpiece W'' into association with the cutter 15, the clamps 42 are first released and the tables uncoupled. This opens the switches S26 and S27 to deenergize the relay AR to break the by-pass circuits for the relay OR through the switches AR3, the intermediate limit switches S23 being then restored to active control of the movement of the separated table 27. The direction and rapid traverse switches 102b and 26 are then closed to initiate movement of the table 27 to the left.

Feeding of the table 27 to effect actual machining of the workpiece is controlled by the direction selector switch 102, a normally closed stop switch 115, and the run switch 24 whose closure energizes a relay XR through a then closed switch JR2 of the jog circuit. Closure of the switch XR1 energizes a relay DR whose switch DR1 completes the circuit for the relay FD which closes its switch 110 to start the feed motor in the direction determined by which of the direction switches 102a or 102b is closed. The relay DR remains energized through a sealing circuit extending through the stop switch 115, switch JR2, the relay winding, a conductor 116, switch DR2, switch BR1, one of switches IR1 or OR1 and finally through the closed one of the selector switches 102a and 102b. Feeding of the table 27 continues until the stop switch is opened to interrupt the sealing circuit for DR and thus deenergize the relays XR and FD.

If the feeding or rapid traversing of the table 21 is continued to the left to the limit position shown in Fig. 6, the dog 79 engages and opens the switch S23, thus breaking the circuit for the relay OR which opens the switches 107 to stop the feed motor thus preventing the table from running off from the feed worm 17. Since the other intermediate limit switch S22 is closed at this time, either the feed motor or the traverse motor may be started to move the table 27 to the right.

After the workpiece on the table 27 has been machined, the table is moved to and parked at the extreme left end of the bed. To do this, the operations above described are repeated to first rapid traverse the table 27 to the right until it approaches the then parked table 28. After jogging the table 27 into full keyed abutment with the table 28, the clamps 42 are applied. With the tables thus coupled together, the combined unit is next rapid traversed to the left past the cutter 15 and on to the left end of the bed until the switch S24 is closed by the dog 101 thus indicating that the table has reached the proper position for parking. Then, after releasing the clamps 42, the table 28 may be rapid traversed to the right into machining position. By manipulating the selector and run switches 102 and 24, the table may be fed past the cutter 15. Movement of the table to the right by either motor is limited by opening of the switch S22 at the position shown in Fig. 5.

When the workpiece to be machined is substantially longer than either of the individual tables, the latter are brought into abutment as described above and then joined together. While the clamps 42 may be used for this purpose, it is preferred to use the clamps 56 which may be applied firmly by tightening the nuts 61. The rigid unit thus formed is then used as a single table as in ordinary milling operations. At this time, the table switches S26, S27 are closed thereby by-passing the intermediate limit switches S22, S23 so that the table unit may be moved back and forth over the full length of the bed between the limit positions shown in Figs. 3 and 4.

Since either of the tables 27 and 28 may be used in the machining of one workpiece while another piece is being set up on the other or parked table, it will be apparent that the over-all efficiency of the machine tool is increased substantially. That is to say, the cutter will ordinarily be out of operation only during the time required for coupling and uncoupling the two tables and parking each table after a workpiece thereon has been machined. The single feed element on the bed coacts with the racks on the respective tables for separate feed mechanisms which operate individually to feed or rapid traverse the individual tables but also act jointly in parking either table or in actuating the combined unit when the two tables are coupled together and used in machining long workpieces. The feed mechanism is conditioned for these different purposes automatically and selectively thereby avoiding any danger of the tables being moved out of engagement with the feed worm by careless operation of the control switches.

I claim as my invention:

A machine tool having, in combination, a bed providing a horizontal guideway, first and second tables slidable in said guideway, means for detachably connecting said tables rigidly together in end to end relation or releasing the same for independent movement along said guideway, a power rotated first feed element mounted on said bed intermediate the ends thereof, a two part coacting second feed element meshing therewith and mounted part on said first table and part on the second table for progressive meshing engagement with said first feed element as the drive by the latter is transferred from one table to the other, a first set of limit devices operable when said tables are joined as a unit to control the operation of said first feed element to confine the movement of the unit along said bed to a long range between two limit positions in which said first feed element respectively engages said second feed element near opposite ends of the unit, a second limit device associated with said second table and acting when operative to interrupt the movement of the second table away from said first table when said first feed element is engaging said second feed element near the inner end of the second table, and means operable automatically as an incident to abutment and separation of said tables to render said first and second limit devices operative respectively.

References Cited in the file of this patent

UNITED STATES PATENTS

| 274,242 | Wood | Mar. 20, 1883 |
| 1,138,515 | Todd et al. | May 4, 1915 |
| 1,200,407 | Arrants | Oct. 3, 1916 |
| 1,213,300 | Todd | Jan. 23, 1917 |
| 1,218,044 | Beaman | Mar. 6, 1917 |
| 1,260,096 | Todd | Mar. 19, 1918 |
| 2,072,340 | Johnson | Mar. 2, 1937 |
| 2,089,814 | Ridgway | Aug. 10, 1937 |
| 2,434,751 | Trecker et al. | Jan. 20, 1948 |
| 2,557,850 | Walter | June 19, 1951 |
| 2,575,717 | King | Nov. 20, 1951 |
| 2,686,459 | Eserkaln | Aug. 17, 1954 |
| 2,723,147 | Slaughter et al. | Nov. 8, 1955 |
| 2,732,521 | Carpenter et al. | Jan. 24, 1956 |

FOREIGN PATENTS

| 117,026 | Sweden | Aug. 13, 1946 |
| 442,436 | Germany | Apr. 20, 1924 |
| 571,383 | France | May 16, 1924 |